United States Patent

Lee

[11] Patent Number: 5,991,576
[45] Date of Patent: Nov. 23, 1999

[54] APPARATUS FOR DRIVING PHOTOSENSITIVE BELT

[75] Inventor: Min-soo Lee, Uiwang, Rep. of Korea

[73] Assignee: Samsung Electronics Co., Ltd., Kyungki-do, Rep. of Korea

[21] Appl. No.: 09/084,217

[22] Filed: May 26, 1998

[30] Foreign Application Priority Data

Jul. 18, 1997 [KR] Rep. of Korea ................. 97-33547

[51] Int. Cl.⁶ ............................................... G03G 15/00
[52] U.S. Cl. ........................................................ 399/167
[58] Field of Search ............................. 399/162, 163, 399/167

[56] References Cited

U.S. PATENT DOCUMENTS

| | | | |
|---|---|---|---|
| 5,111,242 | 5/1992 | Tanimoto et al. | 399/167 |
| 5,381,167 | 1/1995 | Fujii et al. | 399/162 X |
| 5,592,261 | 1/1997 | Yoshino | 399/167 |
| 5,678,144 | 10/1997 | Osaki et al. | 399/167 |
| 5,701,549 | 12/1997 | Portig et al. | 399/167 X |

*Primary Examiner*—Fred L. Braun
*Attorney, Agent, or Firm*—Sughrue, Mion, Zinn Macpeak & Seas, PLLC

[57] ABSTRACT

An apparatus for driving a photosensitive belt is applied to an electrophotographic printer in which a continuously moving photosensitive belt is scanned by an optical beam, thereby forming a latent image on the photosensitive belt for a developer liquid to be applied. The apparatus for driving the photosensitive belt includes a photosensor, a controller and a stepping motor. The photosensor is installed at a position near to the rear end of the scanning area for generating a pulse signal whenever a unit scan line of the photosensitive belt has been completely scanned by the optical beam. The controller processes the pulse signal and drives the stepping motor to rotate a predetermined angle to thereby move the photosensitive belt a unit scan line distance whenever the driving pulse signal from the controller is applied thereto. In this way, the speed of the photosensitive belt will not be excessive so as to prevent complete scanning of each scan line of the optical beam.

9 Claims, 5 Drawing Sheets

APPARATUS FOR DRIVING PHOTOSENSITIVE BELT

BACKGROUND OF THE INVENTION

1. Field of the Invention

The present invention relates to an apparatus for driving a photosensitive belt of an electrophotographic printer, and more particularly, to an apparatus for driving a photosensitive belt of an electrophotographic printer applicable to a laser printer for a computer, a copier or the like.

2. Description of the Related Art

An important general principle of an electrophotographic printer, is that a photosensitive belt which is continuously moved is scanned by an optical signal and thereby a latent image is formed on the photosensitive belt for developer liquid to be applied. For example, in the surface of the photosensitive belt charged to a potential equivalent to 600 V, the potential of the points illuminated by the scanned optical signal is dropped to 150 V. In this way an electrostatic latent image is formed.

FIG. 1 shows a schematic diagram of a general electrophotographic printer. Referring to FIG. 1, a printer 10 includes a photosensitive belt 14 which is moving around a driving roller 11, a tension roller 12, guide rollers 13, as well as a developing device 15 and a transfer roller 17.

The entire width of the surface of the photosensitive belt is charged to a potential equivalent to 600 V. A laser scanning unit 20, installed adjacent to the developing device 15, scans the surface of the photosensitive belt 14 by means of a laser beam. The laser beam is switched so as to selectively illuminate the belt across its width, based on the image to be made. Accordingly, the potential of the illuminated points along the scanned portion of the belt is dropped to 150 V, and an electrostatic latent image is thereby formed.

A plurality of developing devices 15 may be employed according to the number of colors, for example, black, yellow, cyan, magenta, etc. Here, the number of laser scanning units 20 is the same as that of the developing devices 15. Each developing device 15 is provided with corresponding color developer. The developer is applied by a developing roller 15a to the points forming an electrostatic latent image on the surface of the photosensitive belt 14. A backup roller 16a assists the action of the developing roller 15a.

The developer T applied to the photosensitive belt 14 is transferred to printing paper 19 via a transfer roller 17. Here, the printing paper 19 passes between the transfer roller 17 and a pressure roller 18. A backup roller 16b assists the action of the transfer roller 17.

In the electrophotographic printer as described above, a DC (direct current) motor is conventionally employed to move the photosensitive belt 14 at a constant speed. Referring to FIG. 2, a conventional photosensitive belt driving unit comprises a DC motor 23, a tachometer 24, a microprocessor 21 and a driver 22. The DC motor 23 drives the photosensitive belt 14 (FIG. 1) via the driving roller 11 (FIG. 1). The tachometer 24 generates a speed signal proportional to the rotation speed of the DC motor 23. The microprocessor 21 compares the speed signal input from the tachometer 24 with a preset speed signal and outputs a modified speed signal, i.e., a speed control signal to the driver 22. The driver 22 applies to the DC motor 23 driving voltages adjusted according to the speed control signal from the microprocessor 21. Accordingly, since the DC motor 23 rotates at a preset speed, the photosensitive belt 14 is driven at a constant speed.

When the photosensitive belt 14 is simply driven at a constant speed as described above, there is a high possibility of incomplete scans. In other words, the photosensitive belt 14 may move even in a state that an optical signal from the laser scanning unit 20 has not completely scanned a unit scan line of the photosensitive belt 14. Therefore, this becomes a factor which causes deterioration in printing quality of a printer. Further, since the DC motor 23 is precisely driven, a feedback control is required, and the driving circuit and the algorithm of the apparatus are complicated.

SUMMARY OF THE INVENTION

To solve the above problem, it is an object of the present invention to provide an apparatus for driving a photosensitive belt of a electrophotographic printer for enabling the photosensitive belt to move so as to ensure that an optical signal has completely scanned a unit scan line of the photosensitive belt.

An apparatus for driving a photosensitive belt according to the present invention to achieve the above objective is applied to an electrophotographic printer in which a photosensitive belt continuously moving is scanned by an optical signal and thereby a latent image is formed on the photosensitive belt for developer liquid to be applied. The apparatus for driving a photosensitive belt includes a photosensor, a controller and a stepping motor. The photosensor is installed at a position near to the rear end of the scanning area for generating a pulse signal whenever a unit scan line of the photosensitive belt has been completed by the scanning optical beam. The controller processes the pulse signal from the photosensor to generate a driving pulse signal. The stepping motor rotates by a predetermined angle to move the photosensitive belt whenever the driving pulse signal is received from the controller.

In the apparatus for driving a photosensitive belt of the present invention, since the stepping motor rotates by a predetermined angle whenever a unit scan line of the photosensitive belt has completely been scanned, the photosensitive belt moves by a unit distance only when a unit scan line of the photosensitive belt has completely been scanned by the optical signal.

Preferably, the controller includes a microprocessor and a driver. The microprocessor processes the pulse signal from the photosensor to generate a speed control signal. The driver generates the driving pulse signal according to the speed control signal from the microprocessor.

BRIEF DESCRIPTION OF THE DRAWINGS

The above object and advantage of the present invention will become more apparent by describing in detail a preferred embodiment thereof with reference to the attached drawings in which.

DESCRIPTION OF THE PREFERRED EMBODIMENT

Figure 1:
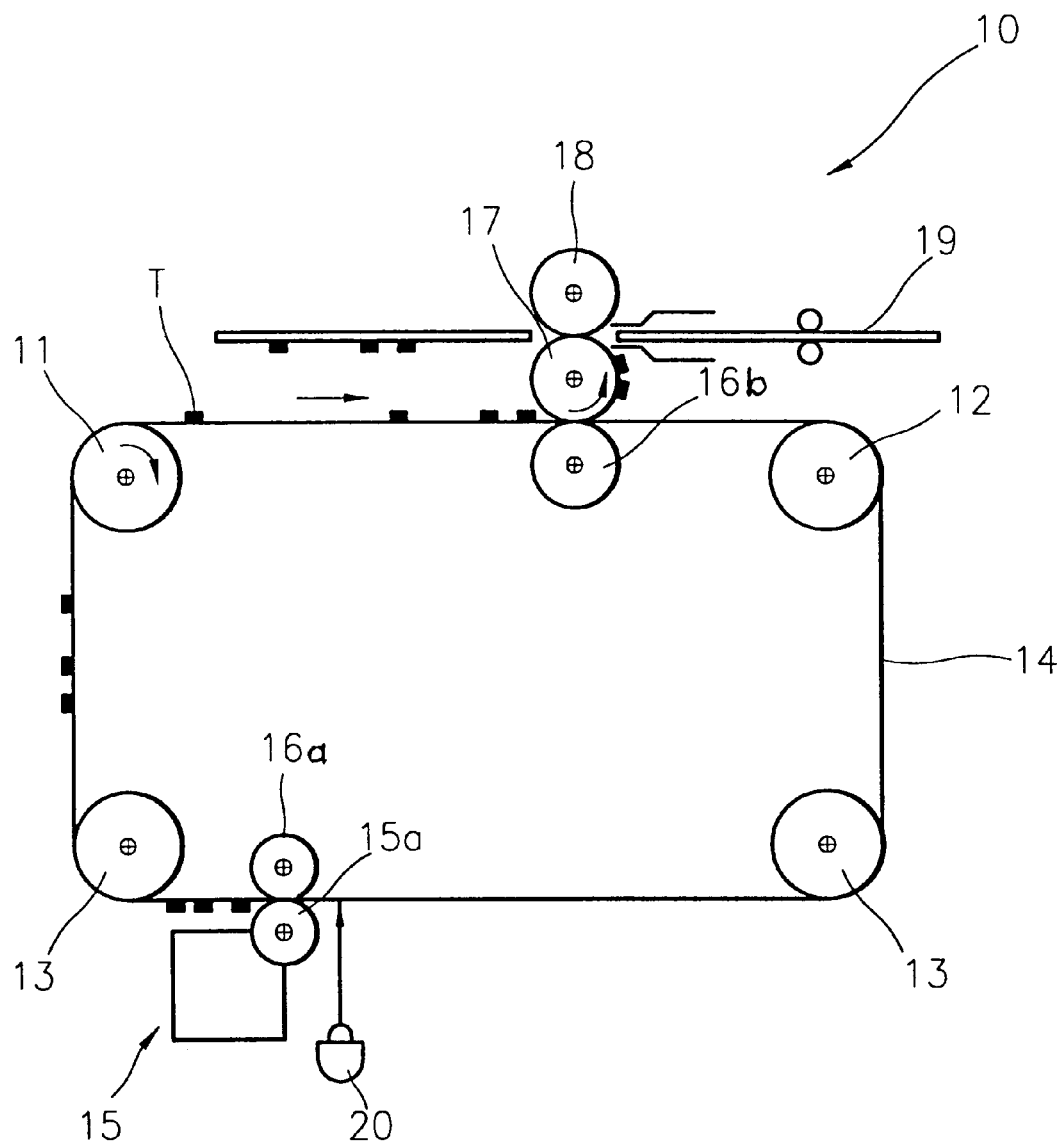
FIG. 1 is a structural diagram illustrating a general electrophotographic printer.
Figure 2:
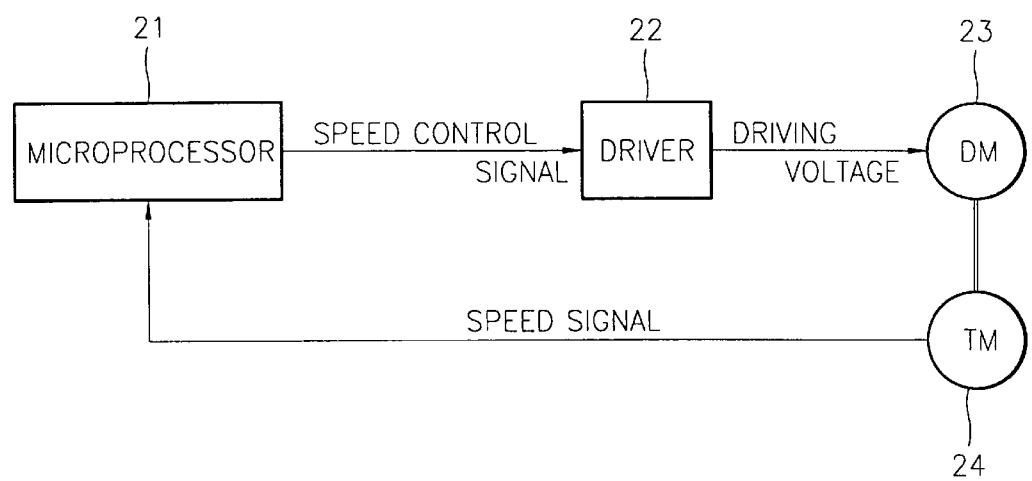
FIG. 2 is a block diagram illustrating a conventional apparatus for driving a photosensitive belt.
Figure 3:
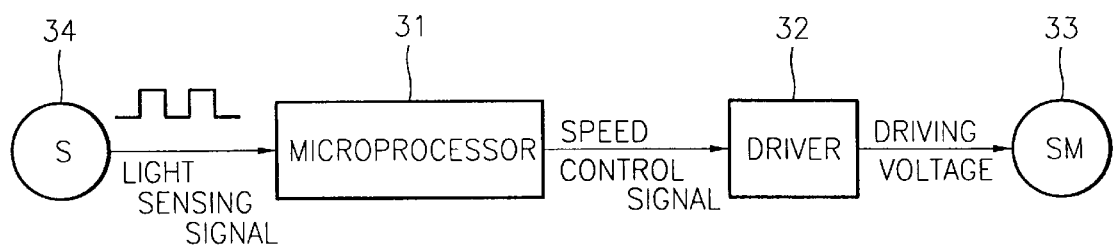
FIG. 3 is a block diagram illustrating an apparatus for driving a photosensitive belt according to the present invention.

Referring to FIG. 3, an apparatus for driving a photosensitive belt according to the present invention includes a photosensor 34, a controller 31 and 32, and a stepping motor 33. The photosensor 34 generates a pulse signal whenever a unit scan line of the photosensitive belt 14 (FIG. 1) has completely been scanned by a laser signal from a laser scanning unit 20 (FIG. 1). The controller 31 and 32 processes the pulse signal from the photosensor 34 to generate a driving pulse signal. Whenever the driving pulse signal from the controller 31 and 32 is applied to the stepping motor 33, the stepping motor 33 rotates by a predetermined angle to move the photosensitive belt 14 an amount corresponding to a unit scan line.

The controller 31 and 32 includes a microprocessor 31 and a driver 32. The microprocessor 31 processes the pulse signal received from the photosensor 34 to generate a speed control signal. The driver 32 generates a driving pulse voltage according to the speed control signal received from the microprocessor 31.

The operation of an apparatus for driving a photosensitive belt according to the present invention is described with reference to FIGS. 1 and 3 through 7.

Figure 4:
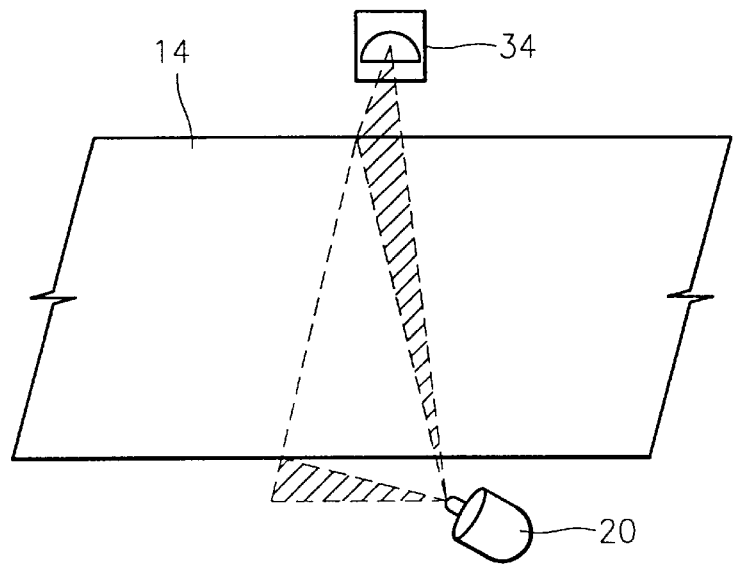
FIG. 4 is a partial perspective view schematically illustrating the position of a photosensor of the apparatus shown in FIG. 3.
Figure 5:
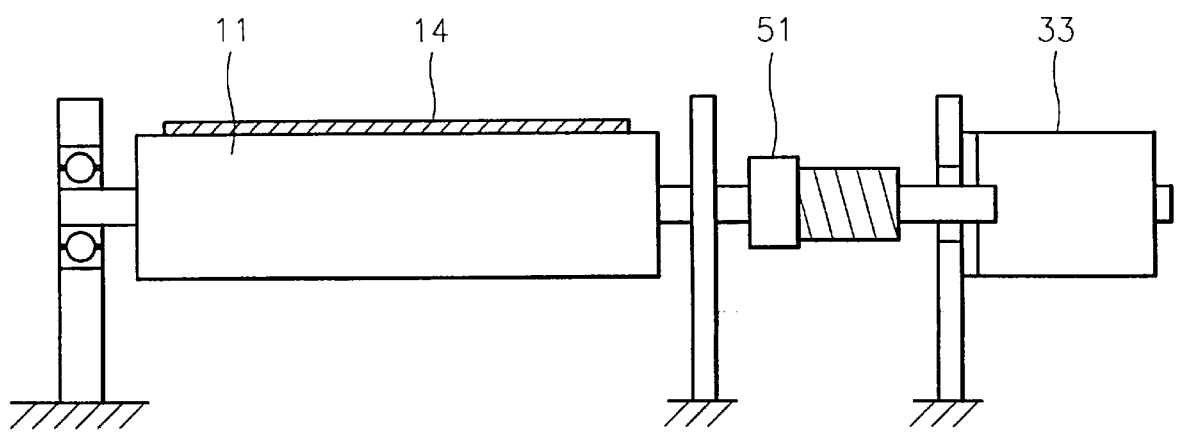
FIG. 5 is a sectional view illustrating a installed state of a stepping motor of the apparatus shown in FIG. 3.

The photosensor 34 is installed at a position near to the rear end of the scanning area of the laser scanning unit 20 (please refer to FIG. 4). Therefore, the pulse signal will be generated by the photosensor 34 whenever a unit scan line of the photosensitive belt 14 has completely been scanned by the laser signal from the laser scanning unit 20. The pulse signal from the photosensor 34 is input into the microprocessor 31 to be processed. The microprocessor 31 processes the wave form of the input pulse signal into a preset form and, accordingly, inputs the processed wave form as the speed control signal into the driver 32.

The driver 32 outputs the driving pulse voltage according to the speed control signal from the microprocessor 31, and makes the stepping motor 33 rotate by a predetermined angle. The shafts of the stepping motor 33 and the driving roller 11 are coupled by a flexible coupling 51 (please refer to FIG. 5). Therefore, when the driving roller 11 is rotated by the stepping motor 33, the photosensitive belt 14 moves by a unit distance.

The above-mentioned procedure is continuously repeated. Since the stepping motor 33 rotates by a predetermined angle whenever a unit scan line of the photosensitive belt 14 has completely been scanned, the photosensitive belt 14 moves by a unit distance only when a unit scan line of the photosensitive belt 14 has completely been scanned by the laser signal. Thus, as the photosensor 34 and the stepping motor 33 are employed, feed-forward control is possible, and accordingly a driving circuit and an algorithm thereof become simple.

Figure 6:
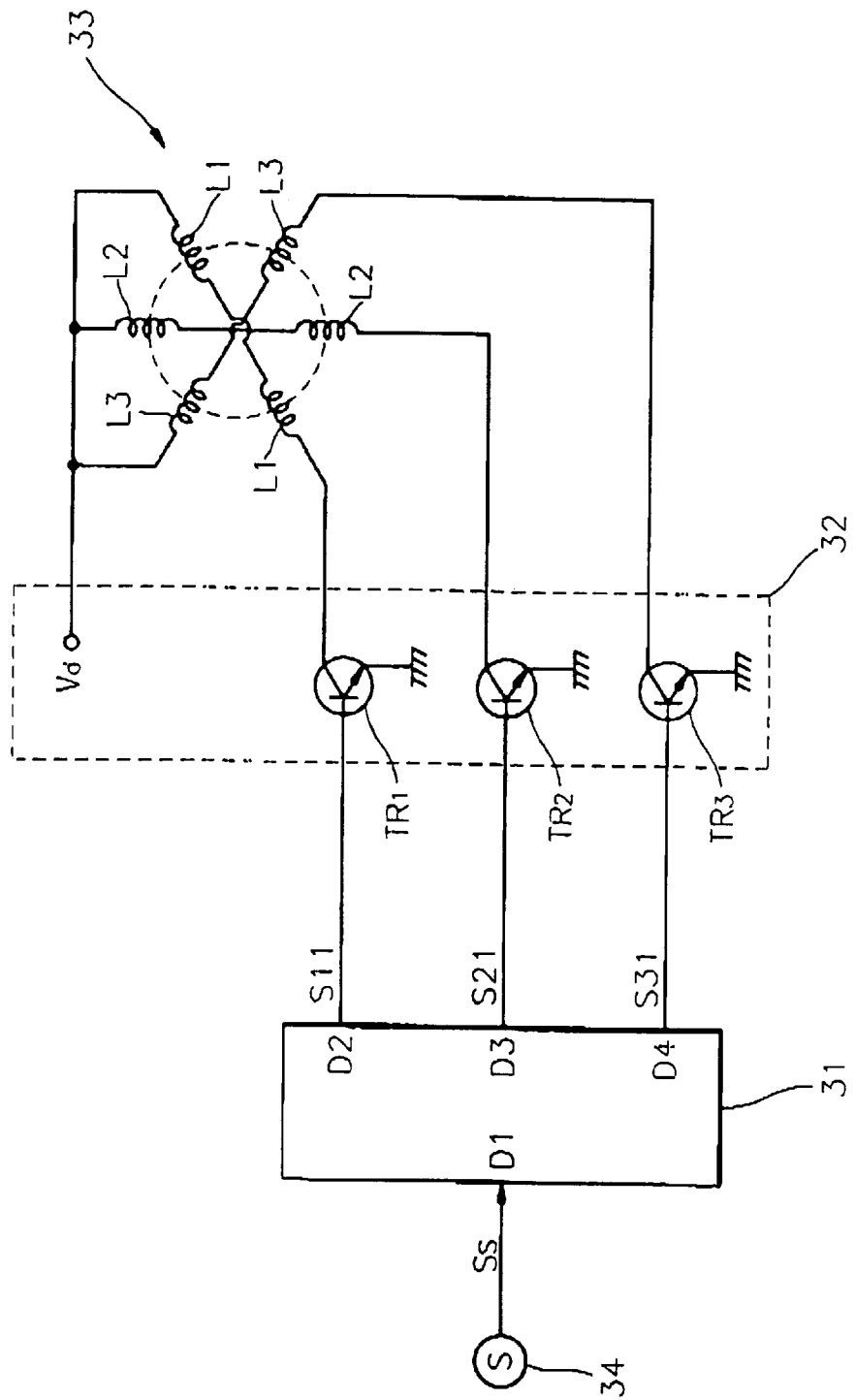
FIG. 6 is a circuit diagram illustrating the apparatus shown in the block diagram of FIG. 3.
Figure 7:
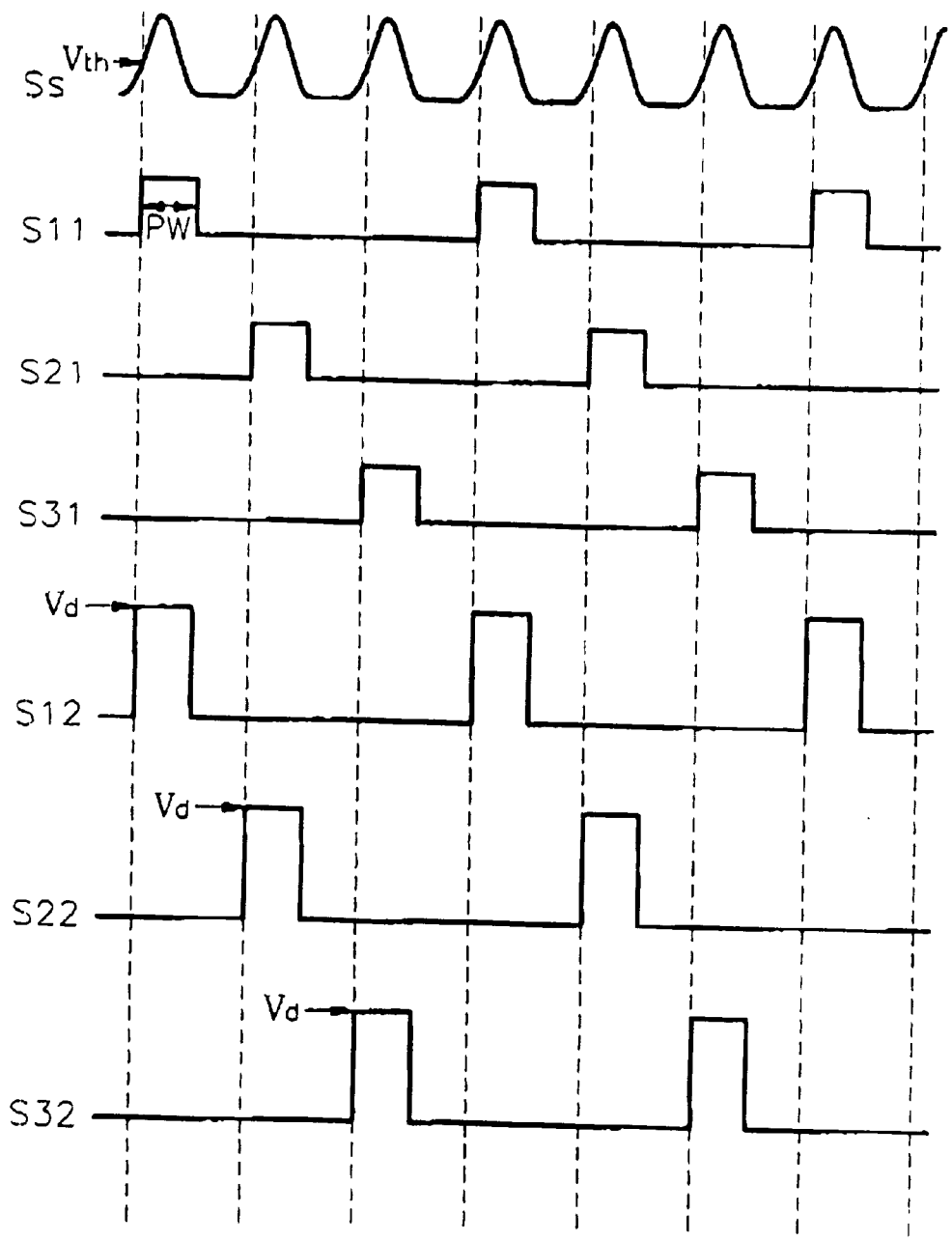
FIG. 7 is a wave form timing diagram showing the signals in the circuit of FIG. 6.

Referring to FIGS. 6 and 7, the light sensing signal Ss from the photosensor 34 is inputted to a data terminal D1 of the microprocessor 31. A first control signal S11 is output from a data terminal D2 of the microprocessor 31 and is input to the base of the first driving transistor TR1 in the driver 32. Likewise, a second speed control signal S21 is output from a data terminal D3 of the microprocessor 31 and is input to the base of the second driving transistor TR2 in the driver 32. Similarly, a third control signal S31 is output from a data terminal D4 of the microprocessor 31 and is input to the base of the third driving transistor TR3 in the driver 32.

The microprocessor 31 operates so that each speed control signal S11, S21, and S31 sequentially take a pulse whenever the light sensing signal Ss rises above a threshold level Vth. Accordingly, the pulse width PW is constant in the speed control signals S11, S21, and S31. Corresponding to each of the speed control signals S11, S21, and S31, each of driving pulse signal S12, S22, and S32 takes a pulse of the driving voltage Vd to be applied to the corresponding coils L1, L2, and L3 of the stepping motor 33.

On the other hand, in a printer provided with a plurality of the developing devices 15 and relative laser scanning devices 20, each photosensor 34 can be installed at a position near to the rear end of the scanning area of each laser scanning unit 20. In such a case, the controller 31 and 32 controls the stepping motor 33 to rotate by a predetermined angle whenever the pulse signals from all the photosensors 34 are input thereto.

As described above, in an apparatus for driving a photosensitive belt of an electrophotographic printer according to the present invention, since the photosensitive belt moves when an optical signal has completely scanned a unit scan line of the photosensitive belt, not only the quality of printed image is enhanced, but additionally a driving circuit and an algorithm thereof become simple.

The present invention is not limited to the above-described preferred embodiments. Thus, various modifications, variations, or improvements may be made to the preferred embodiments by those skilled in the art without departing from the spirit and scope of the present invention.

What is claimed is:

1. An apparatus for driving a photosensitive belt of an electrophotographic image recorder in which the photosensitive belt is scanned by an optical signal thereby forming a latent image on the photosensitive belt for developer material to be applied, the apparatus comprising:

a photosensor disposed near to the rear end of a scanning area, said photosensor generating a pulse signal whenever a unit scan line of the photosensitive belt has completely been scanned by the optical signal;

a controller, connected to said photosensor to receive said pulse signal, said controller generating a driving pulse signal based on said pulse signal; and a stepping motor which rotates by a predetermined angle to move the photosensitive belt whenever said stepping motor receives said driving pulse signal from said controller.

2. The apparatus for driving a photosensitive belt of an electrophotographic image recorder as claimed in claim 1, wherein the controller comprises:

a microprocessor for processing said pulse signal from said photosensor to generate a speed control signal; and a driver for generating said driving pulse signal according to said speed control signal received from said microprocessor.

3. The apparatus for driving a photosensitive belt of an electrophotographic image recorder as claimed in claim 2, wherein said speed control signal is a pulse.

4. The apparatus for driving a photosensitive belt of an electrophotographic image recorder as claimed in claim 3, wherein said pulse is a constant width.

5. The apparatus for driving a photosensitive belt of an electrophotographic image recorder as claimed in claim 1, wherein said optical signal is a laser signal generated by a laser scanning unit.

6. An apparatus for driving a photosensitive belt of an electrophotographic image recorder in which the photosensitive belt is scanned by a plurality of optical signals thereby forming a latent image on the photosensitive belt for plural developer materials to be applied, the apparatus comprising:

a plurality of photosensors, wherein each of said photosensors is disposed near to the rear end of a scanning area, and wherein each of said photosensors generates a respective pulse signal whenever a unit scan line of the photosensitive belt has completely been scanned by a corresponding one of said plurality of optical signals;

a controller, connected to each of said plurality of photosensors to receive said pulse signal, said controller generating a driving pulse signal based on the respective pulse signals generated by said plurality of photosensors; and a stepping motor which rotates by a predetermined angle to move the photosensitive belt whenever said stepping motor receives said driving pulse signal from said controller.

7. The apparatus for driving a photosensitive belt of an electrophotographic image recorder as claimed in claim 6, wherein the controller comprises:

a microprocessor for processing said respective pulse signals from said plurality of photosensors to generate a speed control signal; and a driver for generating said driving pulse signal according to said speed control signal received from said microprocessor.

8. The apparatus for driving a photosensitive belt of an electrophotographic image recorder as claimed in claim 7, wherein said speed control signal generated by said microprocessor is a speed control pulse which is generated only when a pulse signal has been received from each of said photosensors, thereby indicating that each one of said plurality of optical signals has completed a scan across the photosensitive belt.

9. The apparatus for driving a photosensitive belt of an electrophotographic image recorder as claimed in claim 6, wherein each one of said optical signals is a distinct laser signal generated by a respective laser scanning unit.

\* \* \* \* \*